United States Patent
Evans et al.

[11] Patent Number: 5,573,606
[45] Date of Patent: Nov. 12, 1996

[54] ALUMINUM ALLOY AND METHOD FOR MAKING DIE CAST PRODUCTS

[75] Inventors: James M. Evans; Richard J. Hagan, both of Evansville; William C. Routh, Newburgh, all of Ind.; Roland N. Gibbs, Anderson, Ky.

[73] Assignee: Gibbs Die Casting Aluminum Corporation, Henderson, Ky.

[21] Appl. No.: 391,402

[22] Filed: Feb. 16, 1995

[51] Int. Cl.[6] .................................. C22C 21/06
[52] U.S. Cl. .................. 148/440; 74/552; 148/417; 148/439; 301/65; 420/532; 420/533; 420/534; 420/535; 420/541; 420/542; 420/543; 420/544; 420/546; 420/547
[58] Field of Search .................. 148/417, 439, 148/440; 420/532, 533, 534, 535, 541, 542, 543, 544, 546, 547; 74/552; 301/65

[56] References Cited

U.S. PATENT DOCUMENTS

| | | |
|---|---|---|
| 3,237,480 | 3/1966 | Phelon ............................. 74/572 |
| 3,856,360 | 12/1974 | Lindberg et al. ................. 301/65 |
| 4,062,704 | 12/1977 | Sperry et al. .................... 148/439 |
| 4,448,091 | 5/1984 | Bauer et al. ...................... 74/552 |
| 4,976,918 | 12/1990 | Nishi et al. ...................... 420/546 |
| 5,085,097 | 2/1992 | Harata et al. ..................... 74/552 |
| 5,211,216 | 5/1993 | Drury et al. ..................... 164/120 |

FOREIGN PATENT DOCUMENTS

| | | |
|---|---|---|
| 132650 | 2/1985 | European Pat. Off. . |
| 341185 | 2/1931 | United Kingdom . |
| 1210264 | 10/1970 | United Kingdom . |
| 2058694 | 4/1981 | United Kingdom . |

OTHER PUBLICATIONS

Effect of Beryllium on the Properties of A357.0 Castings. D. A. Granger et al. *Trans. Am. Foundrymen's Soc.*, 92, pp. 579–586, 1984.

Japanese Industrial Standard UDC 669.715–143, Aluminum Alloy Die Castings, JIS H 5302, pp. 1–5 (1976).

Improving Aluminum Castings with Beryllium. Keith G. Wikle. *Transactions of the American Foundrymen's Society*. vol. 86 pp. 513–518 (Apr. 1978).

The Al–Be–Mg System (Aluminum–Beryllium–Magnesium). S. Stiltz. *Journal of Phase Equilibria*, vol. 13 No. 6, pp. 636–640, Dec. 1992.

Beryllium in aluminum and magnesium alloys. C. Houska. *Metals and Materials*, vol. 4 No. 2, p. 100, Feb. 1988.

*Primary Examiner*—David A. Simmons
*Assistant Examiner*—Robert R. Koehler
*Attorney, Agent, or Firm*—Barnes & Thornburg

[57] ABSTRACT

The present invention relates to an aluminum base die casting alloy having substantially improved mechanical properties, and a method for making die cast products from the alloy. More particularly the improved aluminum based alloy comprises 2.5–4.0% by weight magnesium, 0.2–0.6% by weight manganese, 0.25–0.6% by weight iron, 0.2–0.45% by weight silicon, less than 0.003% by weight beryllium with the remainder being aluminum.

8 Claims, 1 Drawing Sheet

ALUMINUM ALLOY AND METHOD FOR MAKING DIE CAST PRODUCTS

FIELD OF THE INVENTION

The present invention relates to an aluminum base die casting alloy having substantially improved mechanical properties, and a method for making die cast products from the alloy. More particularly the improved aluminum based alloy comprises 2.5–4.0% by weight magnesium, a maximum of 0.4% by weight manganese, a maximum of 0.6% by weight iron, a maximum of 0.45% by weight silicon, a maximum of 0.10% by weight copper, less than 0.003% by weight beryllium with the remainder being aluminum. This aluminum alloy is particularly useful for die casting light weight automobile component parts.

BACKGROUND AND SUMMARY OF THE INVENTION

The manufacturing industry, and particularly the automotive industry, has increasingly been replacing ferrous materials with light weight materials such as aluminum. The demand for substitute light weight materials has led to the development of aluminum alloys capable of forming structures that will withstand stresses typically reserved for structures formed from ferrous metals. In addition to enhanced strength (including both high yield strength and high elongation values) an aluminum alloy should be die-castable, corrosion resistant, and readily machinable.

Historically, aluminum castings have been characterized by relatively low strength and ductility compared to wrought products of similar compositions. This low strength and ductility is due to the presence of defects in cast alloys which are largely eliminated by mechanical working in wrought alloys. These defects are chiefly of two types: voids due to shrinkage or gas inclusions, and rather large brittle particles due to intermetallic phases formed from impurity elements or oxide inclusions trapped in the casting during solidification. The development of higher quality castings results from changes in alloy composition and casting techniques designed to minimize the number and size of these defects.

The highest quality aluminum casting alloys, in most part, fall into the Aluminum/Silicon/Magnesium (Al-Si-Mg) type of alloy. Enhanced strength and ductility is achieved chiefly by using high purity input (low iron content and/or modification of $AlSiFe_5$ by Beryllium (Be) additions) as well as keeping the alloy clean. As a consequence of these changes, properties of presently available aluminum castings can approach those of wrought products of equivalent composition. However, there remains a need for an aluminum alloy having further enhanced mechanical properties. The aluminum based alloy of the present invention has substantially improved yield strength and elongation values over currently available aluminum alloys.

The effects of various elements on the mechanical properties of aluminum alloys have been studied, however, the investigations have been conducted mostly on relatively simple systems, binary or ternary alloys. Most commercial aluminum die casting alloys are complex alloy systems containing several alloy and impurity elements. The large number of elements encountered in these alloys, their low, varying concentrations and the possibility of interactions between the alloy elements, makes the systematic study of the effect of the individual elements on the properties of commercial alloys very complicated and difficult. Regardless of the difficulty in deciphering the effects individual elements have on an alloy's mechanical properties, magnesium, manganese, iron, silicon, and beryllium are accepted by skilled practitioners as having the following general effects on aluminum alloy properties:

Magnesium is typically incorporated to enhance the tensile strength of the alloy. Al-Mg binary alloys have high strength, excellent corrosion resistance, weldability and surface finish. However, while increased magnesium content enhances the hardness and fatigue resistance of the alloy, it also decreases the alloy's ductility. An additional reason for limiting magnesium content in the alloy is that magnesium can easily oxidize to form magnesium oxide (MgO) micro-sized particles within the melt. At high holding temperatures (greater than 750° C.) spinel, which is a complex aluminum magnesium oxide, usually forms and grows rapidly forming inclusions in the melt. These inclusions reduce the fluidity and elongation properties of the alloy.

Copper can also be added to an aluminum alloy to increase the strength of the alloy. As copper content increases, hardness of the alloy increases, but strength and ductility depend on whether the Cu is in solid solution, or as spheroidized and evenly distributed particles. Copper decreases the electrolytic potential, and also the corrosion resistance. Copper bearing alloys tend to pit severely in the annealed condition and when age hardened may be susceptible to intergranular or stress corrosion.

Silicon is an important component of the alloy for the purpose of improving the flowability of the alloy in a molten state during the course of the die casting operation. Al-Si alloys have low shrinkage and narrow freeze range resulting in their good hot tear resistance, soundness and good weldability. Silicon in Al-Mg alloys reduces ductility and elongation without a compensating increase in strength. The combined introduction of copper and silicon significantly increases the hardness of alloy but sharply reduces the elongation.

Iron is typically added to die casting aluminum alloys for the purpose of preventing the aluminum alloy from sticking to a metal die during the course of the die casting operation and enhancing the release of the aluminum alloy from the die. However, the addition of iron will lower the elongation of the aluminum alloy. Manganese is added to aluminum alloys for the purpose of eliminating the adverse effect of the addition of iron. However, an excess of manganese can result in a lowering of the mechanical strength of the aluminum alloy.

Beryllium is added to Al-Mg based alloys to prevent oxidation of the magnesium content of the aluminum alloy. As little as 0.005% to 0.05% by weight beryllium added to an aluminum based alloy melt causes a protective beryllium oxide film to form on the surface. Without the protection that beryllium provides, significant magnesium losses can occur during casting because magnesium is highly reactive to oxygen. Magnesium oxide by itself does not form a protective barrier to prevent magnesium loss. Beryllium has also been included in aluminum alloys to enhance the corrosion resistance, elongation and strength of aluminum alloys. Therefore in accordance with the current state of the art, beryllium is routinely included in Al-Mg alloys; the percentage of beryllium varying with the magnesium content of the aluminum alloy.

Contrary to the presently accepted teaching regarding the benefits of including beryllium in Mg-Al alloys, applicants' have discovered that the mechanical properties of a Mg-Si-Al alloy can be enhanced by lowering beryllium content below 0.003% by weight, including entirely eliminating Be from the alloy.

Berylliosis, a chronic irreversible lung disease, has occurred among workers engaged in the production of beryllium containing alloys. By breathing air contaminated with small particles of beryllium, a person is subjected to the risk of contracting berylliosis. Thus an additional benefit derived from eliminating beryllium from applicants' aluminum alloy is the decreased exposure to beryllium and the prevention of berylliosis.

Applicants' present invention is directed to a die casting aluminum alloy having improved elongation and comprising 2.5–4.0% by weight magnesium, a maximum of 0.4% by weight manganese, a maximum of 0.6% by weight iron, a maximum of 0.45% by weight silicon, a maximum of 0.10% by weight copper, less than 0.003% by weight beryllium with the remainder being aluminum. This aluminum alloy is useful for forming light weight die cast articles having superior elongation over die cast articles formed from currently available aluminum die cast alloys.

DETAILED DESCRIPTION OF THE INVENTION

Figure 1:
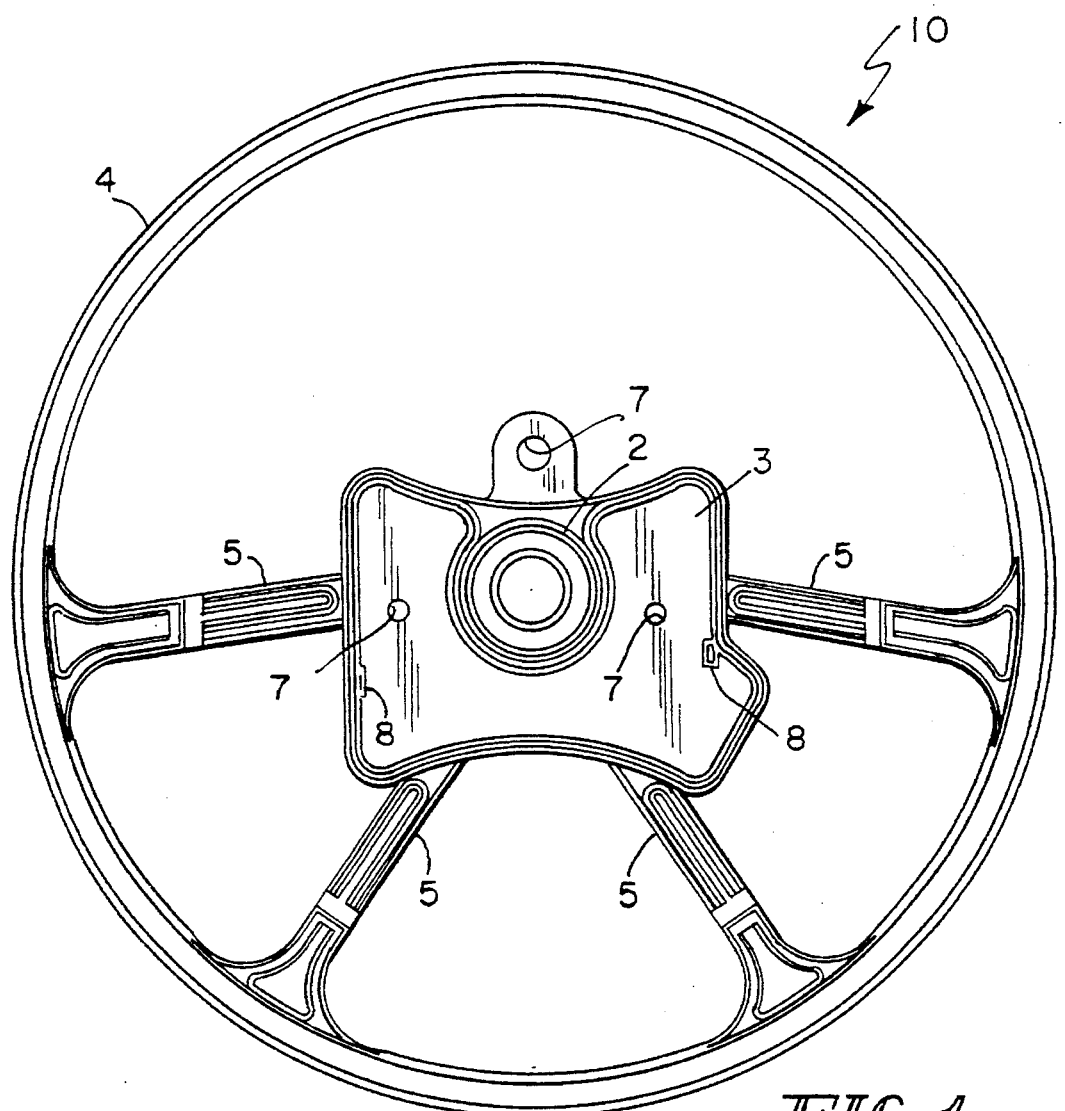
FIG. 1 is an illustration of a typical steering wheel as one embodiment of the present invention.

Previously described die castable aluminum alloys lack the high mechanical strength of the present aluminum compounds. The strength of the present alloys derive in part from their high content of magnesium coupled with a beryllium content of less than 0.003% by weight. The technique of incorporating low amounts of magnesium into aluminum alloys to enhance the strength of the alloy is known to those skilled in the art. Increasing the magnesium content beyond 2.5% by weight is reported to decrease the elongation of the alloy. However, applicants' high magnesium content aluminum alloys (2.5–4.0% by weight magnesium) have enhanced elongation over presently available die castable aluminum alloys.

Beryllium has been described as an important component of magnesium containing aluminum alloys for its properties of preventing oxidation of magnesium. The inclusion of beryllium was also thought to enhance the mechanical strength of the alloy. In fact, applicants' have discovered that decreasing beryllium content in an aluminum alloy having a high content of magnesium (2.5% to 4% by weight) will increase the elongation of the aluminum alloy. Accordingly, the aluminum alloy of the present invention has been formulated to have a beryllium content of less than 0.003% by weight. More preferably the beryllium content is less than 0.0003% by weight and most preferably the beryllium content is zero.

Applicants' invention is directed to an aluminum alloy having 2.5–4.0% by weight magnesium and a beryllium content less than 0.003% by weight. Aluminum alloys in accordance with the present invention also include elements selected from the group consisting of silicon, iron, manganese, copper, zinc, nickel, titanium, chromium, tin and lead. The aluminum based die casting alloys of the present invention also include certain unavoidable impurities (including but not limited to calcium, cadmium, gallium and sodium). A preferred embodiment in accordance with the present invention comprises 2.5–4.0% by weight magnesium, a maximum of 0.10% by weight zinc, a maximum of 0.4% by weight manganese, a maximum of 0.6% by weight iron, a maximum of 0.45% by weight silicon, a maximum of 0.10% by weight copper, less than 0.003% by weight beryllium with the remainder being aluminum.

In one preferred embodiment of the present invention the aluminum alloy comprises 2.5–4.0% by weight magnesium, 0.2–0.4% by weight manganese, 0.25–0.6% by weight iron, 0.2–0.45% by weight silicon, less than 0.003% by weight beryllium with the remainder being aluminum. In an alternative embodiment, the aluminum alloy comprises 2.5–3.0% by weight magnesium, 0.05–0.10% by weight copper, 0.2–0.6% by weight manganese, 0.25–0.6% by weight iron, 0.2–0.45% by weight silicon, less than 0.003% by weight beryllium with the remainder being aluminum.

Applicants' described aluminum alloy has enhanced a yield strength and elongation in comparison to currently available die castable aluminum alloys. In particular, applicants provide a novel die casting aluminum alloy having a yield strength greater than or equal to 11.25 kgf/mm$^2$ (16 Ksi) and an elongation value of greater than or equal to 17%. More preferably the alloy has a yield strength of 11.95 to 12.65 Kgf/mm$^2$ (17 to 18 Ksi) and an elongation value of greater than or equal to 20%.

The aluminum alloy of the present invention is prepared using standard procedures known to those of ordinary skill in the art. The present aluminum alloy can be used in standard die casting processes known to those skilled in the art to form a variety of light weight die cast articles. Preferably a vacuum die casting process is used wherein the process involves drawing a vacuum on the mold cavity and the passageways (the runner system including the shot sleeve and transfer tube to the furnace) through which the molten metal is fed to remove air which might otherwise be trapped by the molten metal. The process of using this vacuum system to draw the molten metal into the shot sleeve is referred to as vacuum ladling.

One preferred process for die casting the present aluminum alloy utilizes VERTICAST die cast machines. VERTICAST machines are die cast machines known in the trade for their vertical orientation, particularly an orientation in which the upper and lower molds are carried, respectively, on upper and lower platens to provide a plurality of mold cavities spaced about a vertical center axis with a vertically arranged shot sleeve and injection plunger for forcing the molten metal upwardly into the concentrically arranged mold cavities. However, the aluminum alloy of the present invention can also be cast with equal efficiency on horizontal casting machines that have been modified for vacuum die evacuation ladling. Most preferably the aluminum alloy is cast using the process described in U.S. Pat. No. 5,211,216, the disclosure of which is expressly incorporated herein by reference. This process ensures minimal contact of the alloy with atmospheric oxygen, thus reducing the need for beryllium in the magnesium aluminum alloy to control magnesium oxidation.

The present aluminum alloy can be used to form a variety of motor vehicle parts including but not limited to steering wheels, steering columns, instrument panel and instrument panel braces, seat backs and seat bottoms, airbag modules/cans, wheel rims, brake drums and energy absorbing brackets. The alloy is particularly suited for any application having load and impact requirements where properties of high elongation are desirable.

In one embodiment a steering wheel is formed from the aluminum alloy of the present invention. A typical steering wheel in accordance with the present invention is illustrated by FIG. 1. The steering wheel 1 includes an axially extending hub portion 2 attached to a base plate 3, a ring part 4 disposed around said hub portion and a plurality of spokes 5 interconnecting said base plate and ring part. Base plate 3 is coupled to a base plate extention portion 6, said base plate and base plate extention having a plurality of bolt holes 7 and notches 8 to provide means for attaching additional components to said steering wheel.

EXAMPLE 1

Comparison of Al-Mg Alloy Strength With and Without Be

Figure 2:
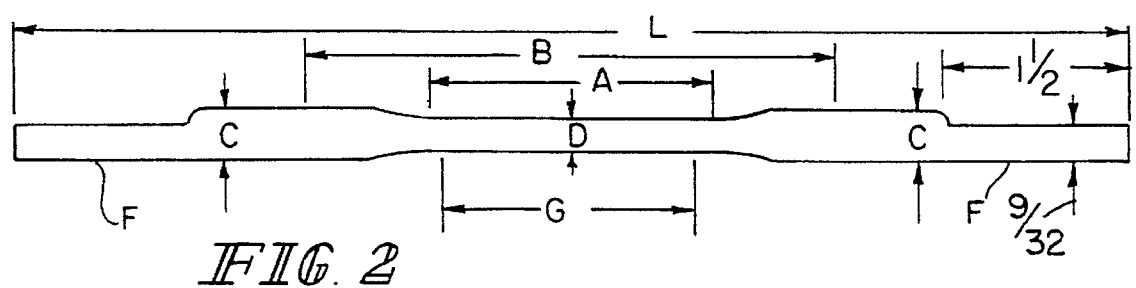
FIG. 2 is a diagram illustrating the shape of a test bar used in measuring tensile strength, yeild strength and elongation of the cast alloy.

Mechanical property tests were conducted at Gibbs Die Casting, ALCAN, Inland Fisher Guide. An MTS testing machine, Model 810 was used. The testing procedure followed the ASTM standard B 557-84, "Standard Methods of Tension Testing Wrought and Cast Aluminum- and Magnesium-Alloy Products". Tensile strength, yield strength, and elongation were measured using a die cast test bar (see FIG. 2). The test bar has an overall length L of 9 inches minimum, a reduced section A (2.25 inches minimum), a gage length G (2.00 inches length), a diameter D (0.250 inches in length) and a flat end portions F for hardness testing (1.5 inches in length). The distance between grips B is a minimum of 4.5 inches and the diameter of the two end sections C is 3/8 inches. A chart recorder was used to record and display load-displacement diagram and the data of load vs. displacement were stored in a computer for analysis. The tensile strength (TS) was calculated by dividing the maximum load by the original cross-sectional area of the reduced section of the specimen. The load value at fracture is the maximum load for the specimen. In a testing machine this maximum value is automatically stored in its computer operating system and displayed. The maximum load can also be calculated from the curve of load vs. displacement displayed on the chart or stored in the recording computer. The maximum load stored in the machine's computer operating system was used in the TS calculation. The as-die cast specimens used were not perfectly round; the dimensions of the cross-sectional area slightly varied from specimen to specimen. The maximum and minimum diameters at the center of the reduced section were measured for each specimen and the average of the maximum and minimum diameters was used as the diameter for determining the original cross sectional area of the specimen.

The elongation is the increase in length of the gage length, expressed as a percentage of the original gage length. The original gage length of 2,000" was carefully measured and marked. The increase in length of the gage length was determined by carefully fitting the ends of the fractured specimen together and measuring the distance between the gage marks. The elongation can also be calculated based on the curve of load vs. displacement. In this method the increase in length (plastic extension) is estimated by subtracting the elastic extension from the total extension at the fracture. This requires that the curve shows a clear initial straight line, which represents the elastic deformation of the specimen.

Yield strength was determined by the "offset method" at an offset of 0.2%. In this method a straight line is drawn on the stress-strain diagram parallel on the initial straight line on the curve of stress vs. strain. This line is placed at a distance of 0.2% of the length of the reduced section from the initial straight line in the direction of the strain axis. The stress at the point, where the straight line drawn and the stress-strain curve intersect, is the yield strength. In these experiments the load v. displacement curve showed two straight lines at the beginning of loading, and the first line was shorter than the second. In these experiments, the yield strengths were calculated based on the second line, which showed reasonable agreement with specification bars and had a relatively narrow variation.

To determine the effect of beryllium content on the ultimate tensile strength (UTS), yield strength (YS) and elongation (Elong) of aluminum alloys, three different castings (Oct. 1993, February 1994, and Sept. 1994) of aluminum alloys having the following % by weight composition were tested.

|  | Oct. 1993 | Feb. 1994 | Sept. 1994 |
| --- | --- | --- | --- |
| Mg | 2.79 | 2.69 | 2.56 |
| Fe | 0.47 | 0.21 | 0.27 |
| Si | 0.41 | 0.21 | 0.22 |
| Mn | 0.26 | 0.58 | 0.53 |
| Cu | 0.01 | 0.01 | 0.02 |
| Be | 0.0034 | 0.00 | 0.0044 |
| UTS (kgf/mm$^2$) | 23.17 | 23.34 | 22.55 |
| YS (kgf/mm$^2$) | 11.64 | 12.37 | 11.93 |
| Elong (%) | 17.74 | 22.70 | 17.33 |

The data indicates the presence of as little as 0.003–0.004% by weight beryllium in these alloys will significantly reduce the alloy's elongation.

Additional Al-Mg compositions were tested to determine if Be content of less than 0.003% by weight also adversely effects elongation in the high Mg content aluminum alloys of the present invention. Ten test bars of the following composition (% by weight, remainder aluminum) were tested for each alloy and the average UTS, YS and elongation were determined:

|  | Alloy #1 | Alloy #2 | Alloy #3 |
| --- | --- | --- | --- |
| Mg | 2.70 | 2.70 | 2.60 |
| Fe | 0.40 | 0.40 | 0.40 |
| Si | 0.20 | 0.20 | 0.20 |
| Mn | 0.25 | 0.20 | 0.20 |
| Cu | 0.01 | 0.01 | 0.01 |
| Be | 0.00 | 0.0015 | 0.003 |
| UTS (kgf/mm$^2$) | 21.79 | 22.50 | 22.50 |
| YS (kgf/mm$^2$) | 11.46 | 12.09 | 12.58 |
| Elong (%) | 21.5 | 19.3 | 16.8 |

The data indicates that even the presence of 0.0015% by weight Be decreases elongation of the alloy.

EXAMPLE 2

Strength Comparison of Be Lacking, Mg-Al Alloys

Eight aluminum alloy compositions all having 0.00% by weight Be were prepared, cast into test bars and tested for tensile strength, yield strength and elongation. Five test bars were tested for each alloy and the average UTS, YS and elongation was determined.

| Alloy | SI | FE | MN | MG | CU | TI | UTS (kgf/mm$^2$) | YS (kgf/mm$^2$) | ELONG (%) |
|---|---|---|---|---|---|---|---|---|---|
| #1 | 0.20 | 0.25 | 0.25 | 2.75 | 0.07 | 0.00 | 22.5 | 12.0 | 23.5 |
| #2 | 0.20 | 0.25 | 0.60 | 2.83 | 0.07 | 0.04 | 23.2 | 12.3 | 22.7 |
| #3 | 0.20 | 0.60 | 0.60 | 2.83 | 0.07 | 0.00 | 23.9 | 13.2 | 17.0 |
| #4 | 0.45 | 0.60 | 0.60 | 2.79 | 0.06 | 0.00 | 24.6 | 14.1 | 14.3 |
| #5 | 0.20 | 0.60 | 0.25 | 2.77 | 0.07 | 0.04 | 23.2 | 13.2 | 18.0 |
| #6 | 0.45 | 0.60 | 0.25 | 2.80 | 0.07 | 0.04 | 23.9 | 13.9 | 13.6 |
| #7 | 0.45 | 0.25 | 0.25 | 2.79 | 0.07 | 0.04 | 24.6 | 14.1 | 15.8 |
| #8 | 0.45 | 0.25 | 0.60 | 2.77 | 0.07 | 0.00 | 25.3 | 15.1 | 13.3 |

EXAMPLE 3

Comparison of the Effect of Heat on Al-Mg Alloys With and Without Be

The effect of heat on the mechanical properties of Al-Mg alloys is a important factor to the automotive industry. In warm climate locations automotive parts are frequently exposed to high temperatures. Applicants have conducted tests on Al-Mg alloys to determine the effect of beryllium content on the aging of the alloy. Two aluminum alloy compositions, October 1993 (see example 1: 2.79% Mg, 0.47% Fe, 0.41% Si, 0.26% Mn, 0.01% Cu and 0.0034% Be) and February 1994 (see example 1: 2.69% Mg, 0.21% Fe, 0.21% Si, 0.58% Mn, 0.01% Cu and 0.00 Be were cast into test bars. 40 test bars of each alloy were placed in a furnace at 200° F. 10 bars were removed from the oven every week for the October 1993 casting, and at weeks 1, 2, 4, and 12 for the February 1994 casting.

| | | GA Oct. 1992 Beryllium (.0034) | GA Feb. 1994 Beryllium (.0000) |
|---|---|---|---|
| As-Cast | UTS (kgf/mm$^2$) | 23.17 | 23.34 |
| | YS (kgf/mm$^2$) | 11.64 | 12.37 |
| | Elong (%) | 17.74 | 22.70 |
| 1 Week | UTS (kgf/mm$^2$) | 25.44 | 22.99 |
| | YS (kgf/mm$^2$) | 13.76 | 12.23 |
| | Elong (%) | 16.59 | 22.50 |
| 2 Weeks | UTS (kgf/mm$^2$) | 25.87 | 23.20 |
| | YS (kgf/mm$^2$) | 13.35 | 12.73 |
| | Elong (%) | 14.75 | 22.50 |
| 3 Weeks | UTS (kgf/mm$^2$) | 26.05 | |
| | YS (kgf/mm$^2$) | 14.81 | |
| | Elong (%) | 14.96 | |
| 4 Weeks | UTS (kgf/mm$^2$) | 26.13 | 23.20 |
| | YS (kgf/mm$^2$) | 15.03 | 12.58 |
| | Elong (%) | 15.75 | 23.00 |
| 12 Weeks | UTS (kgf/mm$^2$) | | 23.41 |
| | YS (kgf/mm$^2$) | | 12.73 |
| | Elong (%) | | 21.60 |

After 4 weeks of aging, the tensile strength of the Be-containing aluminum alloy increased from 23.17 to 26.13 Kgf/mm$^2$; yield strength increased from 11.64 to 15.03 Kgf/mm$^2$; and elongation decreased from 17.74 to 15.75%. The aluminum alloy cast without beryllium maintained the same tensile strength, yield strength, and elongation even after 12 weeks of heating at 200° F.

We claim:

1. An aluminum based alloy having an elongation value of at least 18%, said alloy comprising 2.7–4.0% by weight magnesium;

a maximum of 0.6% by weight manganese;

a maximum of 0.6% by weight iron;

a maximum of 0.45% by weight silicon;

a maximum of 0.10% by weight copper;

less than 0.003% by weight beryllium;

the remainder being aluminum.

2. The aluminum alloy of claim 1 further comprising 0.01–0.04% by weight titanium.

3. The aluminum alloy of claim 1 further comprising 0.01–0.10% by weight zinc.

4. An aluminum based alloy for use in forming a die cast product, said alloy having an elongation value of at least 18%, said alloy comprising 2.7–3.0% by weight magnesium;

0.2–0.6% by weight manganese;

0.25–0.6% by weight iron;

0.2–0.45% by weight silicon;

less than 0.003% by weight beryllium;

the remainder being aluminum.

5. The aluminum alloy of claim 4 further comprising 0.05–0.10% by weight copper.

6. The aluminum alloy of claim 5 further comprising 0.01–0.04% by weight titanium.

7. A steering wheel core comprising an axially extending hub portion;

a ring part disposed around said hub portion; and a plurality of spokes interconnecting said hub portion and ring part, wherein the steering wheel is formed from an aluminum alloy having an elongation value of at least 18%, said alloy comprising 2.5–4.0% by weight magnesium and less than 0.001% by weight beryllium.

8. A structural article of manufacture comprising an aluminum alloy having a yield strength of greater than or equal to 11.95 kgf/mm$^2$ and an elongation value of greater than or equal to 18%, said aluminum alloy comprising 2.5–4.0% by weight magnesium;

a maximum of 0.6% by weight manganese;

a maximum of 0.6% by weight iron;

a maximum of 0.45% by weight silicon;

a maximum of 0.10% by weight copper;

less than 0.003% by weight Beryllium;

the remainder being aluminum.

\* \* \* \* \*

UNITED STATES PATENT AND TRADEMARK OFFICE
CERTIFICATE OF CORRECTION

PATENT NO. : 5,573,606
DATED : November 12, 1996
INVENTOR(S) : Evans et al.

It is certified that error appears in the above-indentified patent and that said Letters Patent is hereby corrected as shown below:

On title page, item [75], Roland N. Gibbs

City of residence [Anderson] should be -- Henderson --.

Signed and Sealed this

Twelfth Day of August, 1997

Attest:

BRUCE LEHMAN

Attesting Officer

Commissioner of Patents and Trademarks